US009067681B2

(12) United States Patent
Cailleteau

(10) Patent No.: US 9,067,681 B2
(45) Date of Patent: Jun. 30, 2015

(54) SECURE HERRINGBONE ARRANGEMENT FOR THE ARMREST OF A SEAT, SEAT AND TWO SEAT ASSEMBLY PROVIDED WITH SUCH AN ARRANGEMENT

(71) Applicant: Zodiac Seats France, Issoudun (FR)

(72) Inventor: Jeremy Cailleteau, Saint Aout (FR)

(73) Assignee: Zodiac Seats France, Issoudun (FR)

( * ) Notice: Subject to any disclaimer, the term of this patent is extended or adjusted under 35 U.S.C. 154(b) by 0 days.

(21) Appl. No.: 14/184,160

(22) Filed: Feb. 19, 2014

(65) Prior Publication Data

US 2014/0167461 A1    Jun. 19, 2014

Related U.S. Application Data

(63) Continuation of application No. 12/403,473, filed on Mar. 13, 2009, now Pat. No. 8,690,254.

(30) Foreign Application Priority Data

Mar. 17, 2008  (FR) ...................................... 08 51700

(51) Int. Cl.
*B64D 11/00*  (2006.01)
*B60N 2/46*  (2006.01)
(Continued)

(52) U.S. Cl.
CPC .... *B64D 11/06* (2013.01); *B60N 2/01* (2013.01); *B60N 2/46* (2013.01); *B64D 11/0646* (2013.01); *B64D 11/0601* (2013.01); *B64D 11/0604* (2013.01)

(58) Field of Classification Search
CPC ............ B60N 2/305; B60N 2/34; B60N 2/01; B60N 2/46; B64D 11/06; B64D 11/00; B64D 2011/0617; B64D 2011/062; B64D 2011/0606; B64D 11/0646; B64D 11/0601; B64D 11/0604
USPC ....................... 297/248, 257, 354.13, 411.36; 244/118.6
See application file for complete search history.

(56) References Cited

U.S. PATENT DOCUMENTS 797,826 A    8/1905    Sherman
2,164,715 A    7/1939    Krainbill
(Continued)

FOREIGN PATENT DOCUMENTS

| EP | 1495908 | 1/2005 |
|---|---|---|
| EP | 1817228 | 5/2006 |

(Continued)

OTHER PUBLICATIONS

U.S. Appl. No. 12/403,473, Requirement for Restriction/Election date Jun. 8, 2011.
(Continued)

*Primary Examiner* — Milton Nelson, Jr.
(74) *Attorney, Agent, or Firm* — Kilpatrick Townsend & Stockton LLP; Dean W. Russell

(57) ABSTRACT

In herringbone seats of the prior art, armrests on the closed angle side form an obstacle for the passengers in the seat in case of a shock, since the latter are generally projected along the axis of the vehicle and thus towards the armrest thus creating a high risk of injury for the passenger in case of a shock. The present invention provides a secure herringbone arrangement for the armrest of a seat i.e. making it possible to reduce the risk of injuries caused by the armrest, in case of a shock. Therefore, the present invention provides to leave a space between the seating part structure and the armrest to enable the passenger on the seat to be projected along the axis of the airplane in case of a shock without hitting the armrest. More precisely, the aim of the invention is a herringbone arrangement for the armrest of a seat wherein the armrest is angularly shifted with respect to the seat, so as to form a free space between the seat and the armrest. The present invention also relates to a seat and a seat assembly provided with such an arrangement.

4 Claims, 7 Drawing Sheets

(51) Int. Cl.
  *B64D 13/00* (2006.01)
  *B64D 11/06* (2006.01)
  *B60N 2/01* (2006.01)

(56) References Cited

U.S. PATENT DOCUMENTS

| | | | |
|---|---|---|---|
| 2,215,758 A | 9/1940 | Ernest et al. |
| D155,624 S | 10/1949 | Pahlmann |
| 2,494,838 A | 1/1950 | Slaughter |
| 2,514,798 A | 7/1950 | Rowe |
| 2,797,738 A | 7/1957 | Patterson |
| 2,947,349 A | 8/1960 | Kryter |
| 3,883,175 A | 5/1975 | Rodaway |
| 3,910,632 A | 10/1975 | Marechal |
| 4,186,964 A | 2/1980 | Marrujo et al. |
| 4,597,606 A | 7/1986 | Magee |
| 4,930,841 A | 6/1990 | Wittig |
| 5,163,733 A | 11/1992 | Maxwell |
| 5,171,063 A | 12/1992 | Stidd |
| 5,335,962 A | 8/1994 | Gera |
| 5,344,210 A | 9/1994 | Marwan et al. |
| 5,788,183 A | 8/1998 | Marechal |
| 5,795,025 A | 8/1998 | Murphy |
| 6,000,659 A | 12/1999 | Brauer |
| 6,059,364 A | 5/2000 | Dryburgh et al. |
| D443,425 S | 6/2001 | Pomeroy et al. |
| 6,267,445 B1 | 7/2001 | Marais |
| 6,604,789 B1 | 8/2003 | Downing |
| 6,669,141 B2 | 12/2003 | Schmidt-Schaeffer |
| 7,025,306 B2 | 4/2006 | Saint Jalmes |
| 7,178,871 B1 | 2/2007 | Round et al. |
| 7,318,622 B2 | 1/2008 | Rezag et al. |
| D583,579 S | 12/2008 | Pearson et al. |
| 7,469,861 B2 | 12/2008 | Ferry et al. |
| 7,472,957 B2 | 1/2009 | Ferry et al. |
| 7,517,010 B2 | 4/2009 | Saint-Jalmes et al. |
| 7,523,888 B2 | 4/2009 | Ferry et al. |
| 7,578,470 B2 | 8/2009 | Plant |
| 7,578,471 B2 | 8/2009 | Beroth |
| 7,997,531 B2 | 8/2011 | Bettell |
| 2001/0015566 A1 | 8/2001 | Park et al. |
| 2002/0003370 A1 | 1/2002 | Menard |
| 2002/0109379 A1 | 8/2002 | Marechal et al. |
| 2003/0075964 A1 | 4/2003 | Piaulet et al. |
| 2003/0189360 A1 | 10/2003 | Laurent |
| 2004/0099766 A1 | 5/2004 | Pratt, Jr. |
| 2004/0195451 A1* | 10/2004 | Bentley et al. ............. 244/118.6 |
| 2004/0217642 A1 | 11/2004 | Herault |
| 2004/0232283 A1 | 11/2004 | Ferry et al. |
| 2005/0189804 A1 | 9/2005 | Mercier |
| 2006/0011005 A1 | 1/2006 | Wisner et al. |
| 2007/0029444 A1 | 2/2007 | Mercier et al. |
| 2007/0034742 A1 | 2/2007 | Jaeger et al. |
| 2007/0164157 A1 | 7/2007 | Parki |
| 2008/0105784 A1 | 5/2008 | Barroca |
| 2009/0084897 A1 | 4/2009 | Ferry et al. |
| 2009/0146004 A1 | 6/2009 | Plant |
| 2009/0146006 A1 | 6/2009 | Park et al. |
| 2009/0302158 A1 | 12/2009 | Darbyshire et al. |
| 2010/0019086 A1 | 1/2010 | Ferry et al. |
| 2010/0025530 A1 | 2/2010 | Ferry et al. |
| 2010/0038484 A1 | 2/2010 | Ersan |
| 2010/0038485 A1 | 2/2010 | Harcup |

FOREIGN PATENT DOCUMENTS

| | | |
|---|---|---|
| EP | 1963132 | 6/2007 |
| EP | 2154067 | 2/2010 |
| FR | 2748240 | 11/1997 |
| GB | 2362095 | 11/2001 |
| WO | WO-2007042740 | 4/2007 |
| WO | WO-2009077717 | 6/2009 |
| WO | WO-2010018367 | 2/2010 |

OTHER PUBLICATIONS

U.S. Appl. No. 12/403,473, Non-Final Rejection dated Aug. 4, 2011.
U.S. Appl. No. 12/403,473. Final Rejection dated Feb. 24, 2012.
U.S. Appl. No. 12/403,473, Non-Final Rejection dated Sep. 21, 2012.
U.S. Appl. No. 12/403,473, Non-Final Rejection dated Jun. 20, 2013.

* cited by examiner

SECURE HERRINGBONE ARRANGEMENT FOR THE ARMREST OF A SEAT, SEAT AND TWO SEAT ASSEMBLY PROVIDED WITH SUCH AN ARRANGEMENT

CROSS REFERENCE TO RELATED APPLICATIONS

This application is a continuation of U.S. patent application Ser. No. 12/403,473 filed Mar. 13, 2009, now U.S. Pat. No. 8,690,254, which application claims priority to France Patent Application No. 0851700 filed Mar. 17, 2008, the contents of all of which are incorporated herein by reference.

TECHNICAL FIELD OF THE INVENTION

The present invention relates to a secure herringbone arrangement for the armrest of a seat intended for land and air passenger vehicles, more particularly aircrafts. Such an arrangement is intended for a seat, the axis of which is not positioned parallel to the axis of the passenger vehicle in which it is fixed. The invention also relates to a seat as well, as a seat assembly provided, with such an arrangement.

STATE OF THE ART

The seats in an airplane are generally positioned parallel to the longitudinal axis thereof, but in order to improve the passengers' comfort, the so-called herringbone arrangement concept of seats has recently been developed. As a matter of fact, such a disposition in which the axis of the seat is shifted with respect to the axis of the passenger vehicle in which it is fixed makes it possible to gain space while providing reclining seats with a sufficient size to provide comfort to passengers.

Such a herringbone arrangement of aircraft seats is known from document WO2007/124398. Such a document describes an arrangement of aircraft seats, wherein the seats are positioned two by two, so as to form an acute angle. Other configurations are also known, wherein the seats form an obtuse angle.

However, in the herringbone seats of the prior art, the armrests on the closed angle side are an obstacle for the passengers in the seats in case of a shock, since the latter are generally projected along the axis of the vehicle and thus towards the armrest. Thus, in the concepts of armrests for herringbone seats, a high risk of injuries caused by the armrest in case of a shock exists.

PURPOSE OF THE INVENTION

The present invention provides a secure herringbone arrangement for the armrest of seats, i.e. making it possible so reduce the risk of injuries caused by an armrest in case of a shock.

Therefore, the present invention provides to leave a space between the seating part structure of the seat and the armrest to enable the passenger on the seat to be projected along the axis of the airplane in case of a shock without hitting the armrest.

More precisely, the aim of the invention is a herringbone arrangement for the armrest of the seats, wherein the armrest is angularly shifted with respect to the seat, so as to form a free space between the seat and the armrest.

Such an armrest arrangement makes it possible for the passenger in case of a shock to be projected along the axis of the vehicle without hitting the armrest, whereas he/she has a maximum pulse energy. Such a configuration further makes it possible to avoid the torsion of the trunk and the some and it makes it possible to place the passenger in a front crash configuration.

According to various particular embodiments, the invention provides:

a V shaped free space between the armrest and the seat, so as to gain space;
the axis of the armrest is substantially parallel to the axis of the passenger vehicle;
a storage pocket under the flee space in order to make a storage area available for the passenger on the seat;
the integration of a shock absorbing material on the side of the armrest which faces the seat, in order to reduce the risk of injuries for the passenger on the seat in case of a shock;
an armrest which includes a support and a plate on which the passenger may rest his or her arm, with the plate being wider than the support in order no offer a better rest from the passenger's arm;
a part of the armrest is flexible, so as to limit the risks of injuries for the passenger in case of a shock;
a retractable armrest in order to facilitate, access to the seat for a disabled person;
a vertically retractable armrest between a so-called high position and a so-called low position with respect to a standard position, the armrest in the low position being at the level of the seating part structure in order to facilitate the access thereto for a disabled person.

The invention also relates to a herringbone seat for a passenger vehicle including at least a back and a seat having an axis angularly shifted with respect so the axis of the passenger vehicle and including at least one armrest on the closed angle side with respect to the axis of the airplane, shifted according to the arrangement described hereabove.

According to various particularly embodiments, the invention provides that:

a shelf is positioned on the open angle side of the seat;
this shelf includes several storage spaces;
a shell surrounds the back of the seat and the external wall of the armrest;
a shell surrounds the back of the seat, the external wall of the armrest and the shelf;
the shell is globally V shaped;
the shell is made of a thermosetting material;
the shell is formed in one piece;
a video screen is integrated in the back face of the shell;
footrests are integrated in the back face of the shell.

The invention also relates to a two seat assembly for a passenger vehicle with the axis of at least one seat being angularly shifted with respect to the axis of the passenger vehicle and each of the seats including at least one armrest on the closed angle side shifted according to the arrangement defined hereabove, wherein the seats and the armrests of the end seats are surrounded by a shell.

According to various embodiments, the invention provides that:

the shell is made of a thermosetting material;
the shell surrounds both seats in one piece;
the shell is composed of two parts, with each part surrounding one of the seats, which makes it possible to produce individual seats and two seat assemblies on the same production line;
the seats including backs, the shell has, at the back level, a height which is substantially equal to that of the backs;
the shell has, at the armrests level, on the aisle side, a height which is substantially equal to that of the seat on the whole length thereof;

the armrests have a front part which is surrounded by the shell;
a central shelf is positioned between the two seats; such central shelf is preferably formed by two shelves, each of the shelves adjoining one of the seats;
the shell has a reinforcement at the central shelf level in order to increase the space available at the back of the seat;
video screens are integrated in the back face of the shell;
footrests are integrated in the reinforcing part.

BRIEF DESCRIPTION OF THE FIGURES

The invention will be better understood when reading the detailed following description and referring to the appended drawings which respectively show.

EXEMPLARY EMBODIMENT

Figure 1:
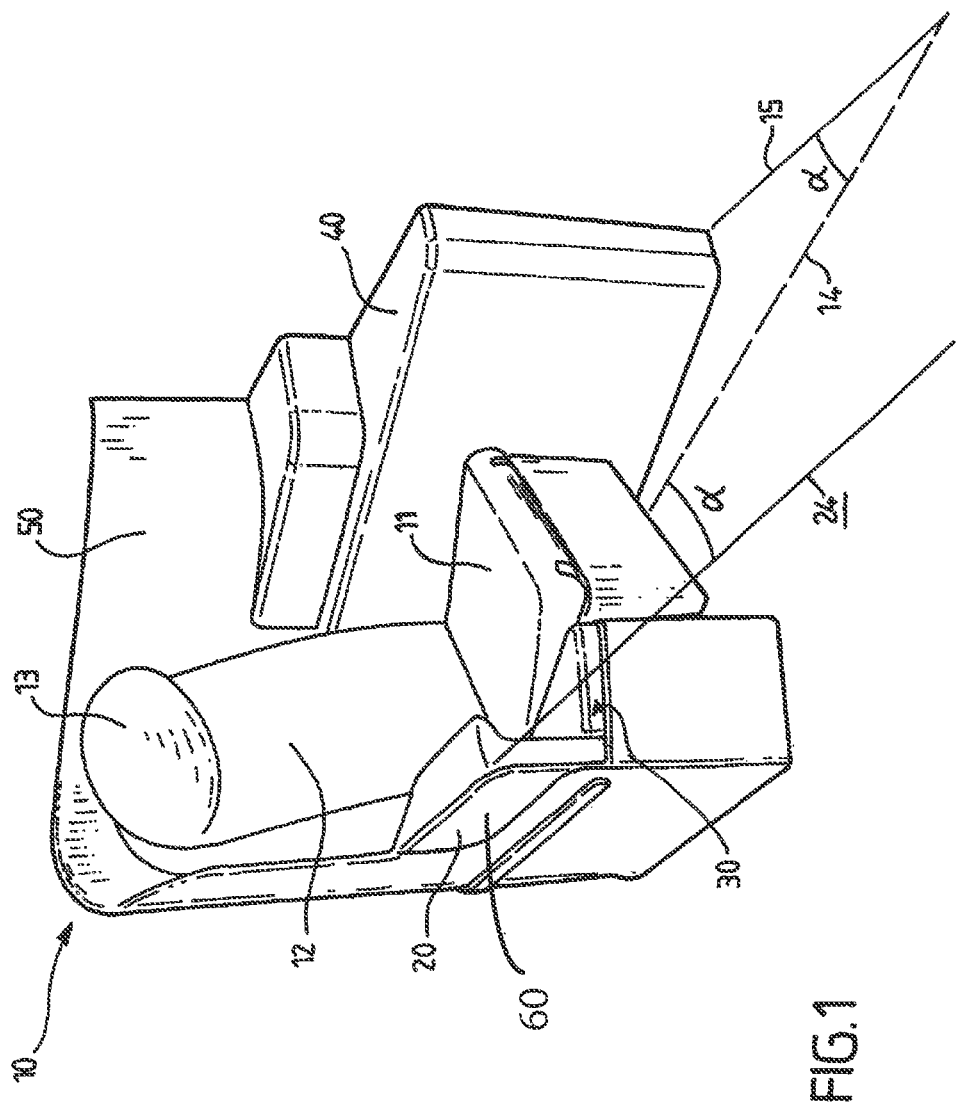
FIG. 1, a perspective view of a herringbone seat including an armrest according to an embodiment of she present invention.

FIG. 1 shows an aircraft seat 10 including an armrest on the closed angle side 20 according to one embodiment of the present invention. This seat includes a seating part 11, a back 12 and a headrest 13. The axis 14 of the seat 10 is shifted with respect to the axis 15 of the plane, so that toe-axis 14 of the seat 10 and the axis of the plane 15 form an angle alpha. The armrest 20 is angularly shifted with respect to the seat 10, so that a free space 30 is available between the seat 10 and the armrest 20. This free space 30 is V shaped and provides a storage pocket 30 in which the passenger may store his or her personal belongings. This angular shift of the armrest 20 with respect to the seat 10 enables the passenger on the seat to be projected along the axis 15 or the plane in case of a shock, without hitting the armrest. This configuration avoids the torsion of the passenger's trunk and places the passenger in a front crash configuration.

The seat 10 also includes a shelf 40 adjoining the seat 10, as well, as a shell 50 which surrounds the shelf 40, the back of seat 13 and the armrest 20. The shelf 50 has a height, at the armrest level, which is equal to that of the seat 11 and it also surrounds the side walls of the storage pocket 30.

Figure 2:
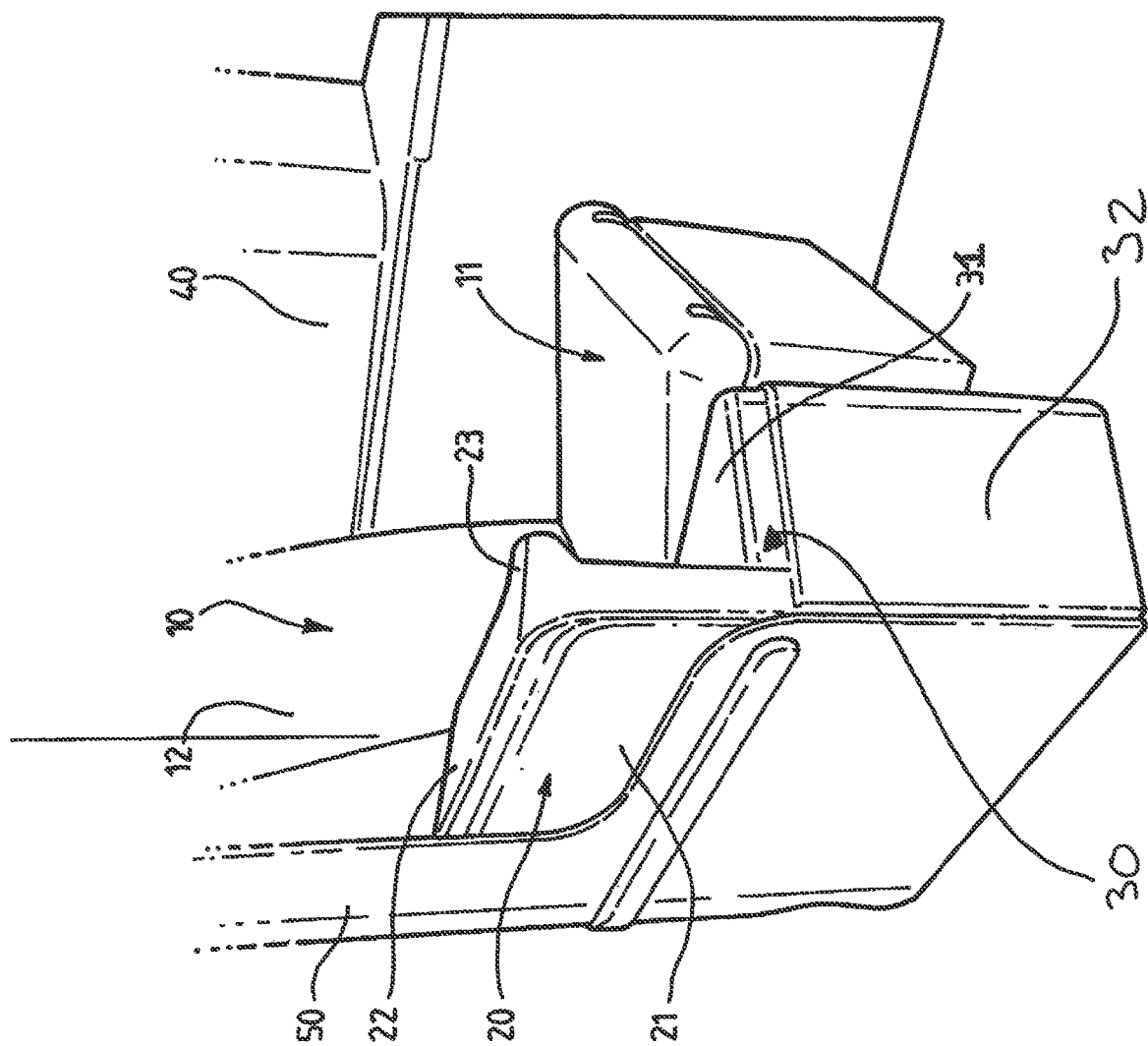
FIG. 2, a perspective view of an armrest in high position according to an embodiment of the present invention.
Figure 3:
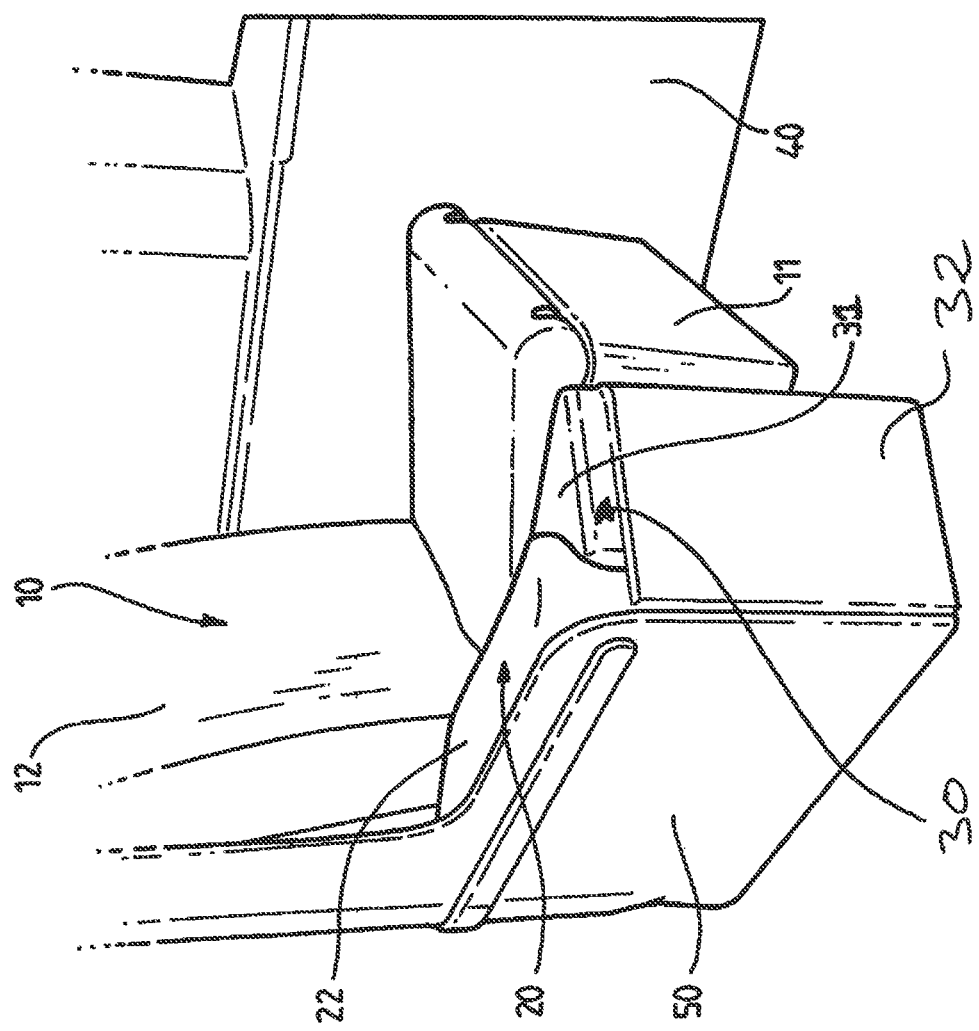
FIG. 3, a perspective view of an armrest in low position according to an embodiment of the present invention.

FIGS. 2 and 3 show she armrest 20 as well as the storage pocket 30 between the seat 10 and the armrest 20. The armrest includes a vertical support 21 as well as a plate 22, which are both angularly shifted with respect so the seat 10. The plate 22 makes it possible for the passenger on the seat to rest his or her arm. The part 23 of the plate which faces the seat includes a shock absorbing material, so as to limit the risks of injury for the passenger on she seat if he or she hits the armrest 20. In this exemplary embodiment, the shock absorbing material is polyurethane foam.

The armrest is retractable between a high position shown in the FIG. 2 and a low position shown in FIG. 3. When the armrest is in high position, its height allows the passenger on the seat to rest his or her arm comfortably. In addition, in low position, the plate 22 of the armrest is substantially at the same height as the seating part of the seat 11, so as to facilitate the access to the seat for a disabled person.

The storage pocket 30 includes a side wall 32 and a horizontal plate 31 which also has a height which is substantially equal to that of the seat. The storage pocket 30 contains the mechanism which enables the armrest 20 to be retracted, but it can also contain a storage space for the passenger of the seat.

Figure 4:
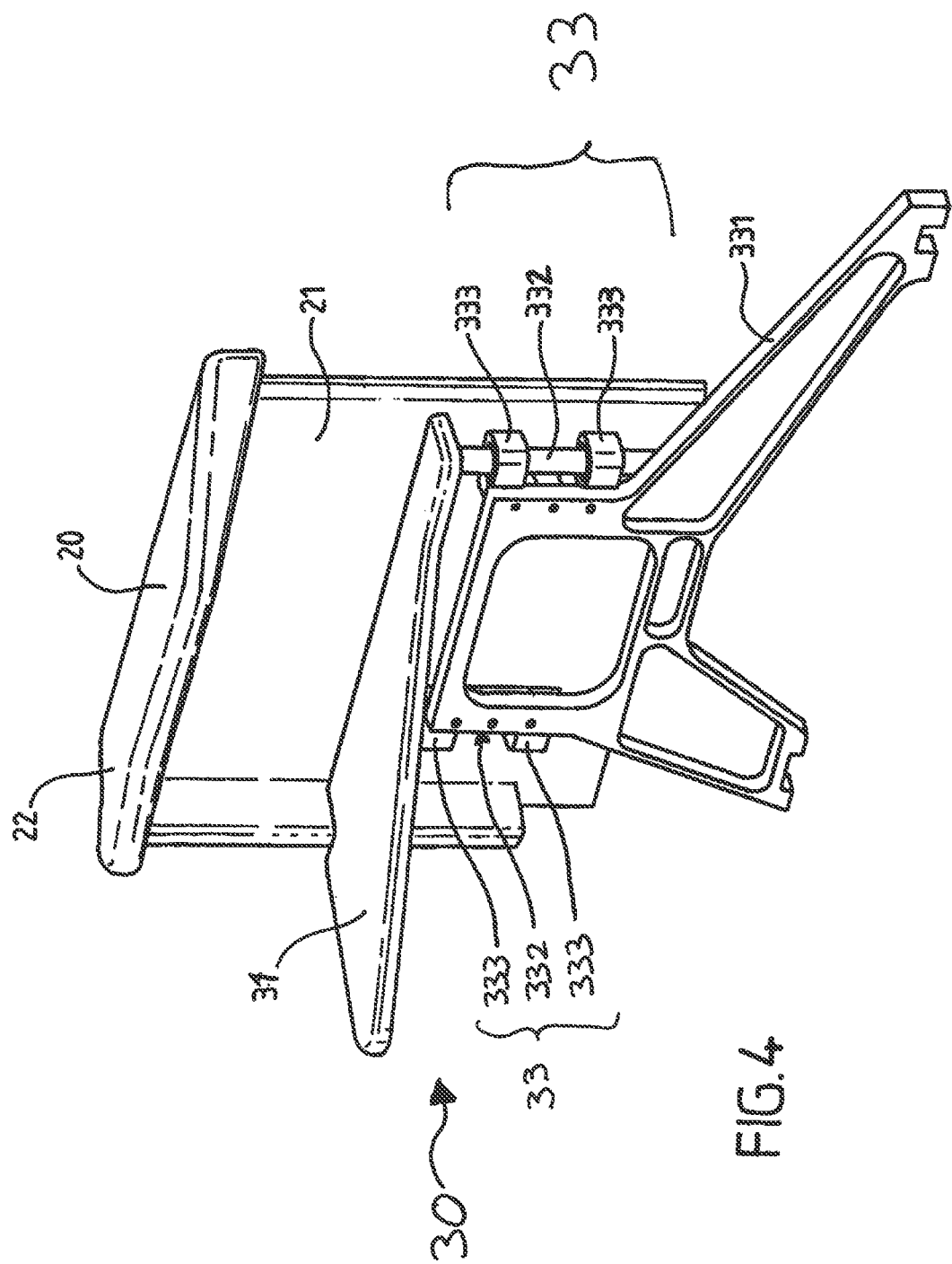
FIG. 4, a perspective view of an armrest mechanism according to the present invention.

FIG. 4 shows a perspective view of the inside of the storage pocket 30. Thus, under the horizontal plate 31 of the storage pocket 30 is a vertical slide mechanism 33 on which the support 21 of the armrest 20 is fixed. This vertical slide mechanism includes a foot 331 which is integral with the floor in the plane as well as two columns 332. Around each of columns 332 are two rings 333 which can slide about the columns 332. The rings 333 are fixed on the inner side of the support 21 of the armrest, so that the armrest slides with the rings 333 between a high position and a low position. In low position, the plate 22 of the armrest 20 rests on the horizontal plate 31 of the storage pocket 30, whereas in high position, as shown in FIG. 4, a locking system holds the armrest in high position.

Figure 5:
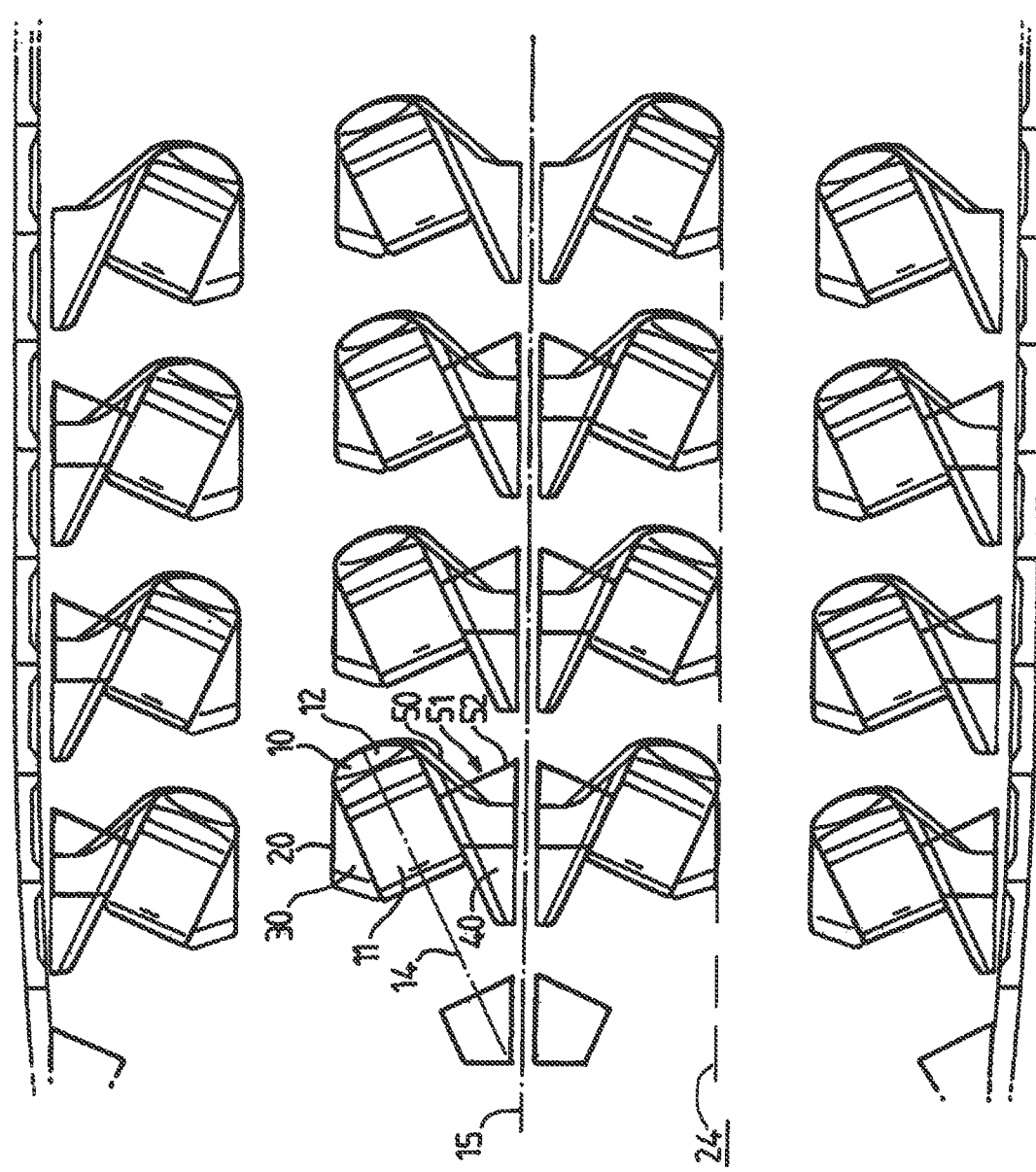
FIG. 5, a top view of an airplane cabin arranged according to the present invention.

FIG. 5 shows a top view of the inside of a plane showing the seats 10 and the armrest 20 thereof according to one embodiment of the present invention. The axis of the seats 14 is angularly shifted with respect to the axis 15 of the plane. The seats include a seating part 11, a back 12, an armrest on the closed angle side 20, as well as a tree space 30 between the armrest on she closed angle side and the seat 10. The free space 30 is sized so that the armrest axis 24 is parallel to the axis of the plane 15. Each seat has a shear 40 on the open angle side. In addition, each seat 10, the armrest 20 thereof as well as the shelf 50 thereof, is surrounded by a shell 50 which follows the shape of the seat, the armrest and the shelf as close as possible. The shell has a reinforcement 51 behind the central shelf. In this reinforcement 51 footrests 52 are provided making it possible for the passengers on the seats to extend their legs.

The seats 10 are positioned on three rows in the plane: the central row is formed by assemblies of two adjoining seats, whereas the side rows are formed by a succession of seats positioned one behind the other.

Figure 6:
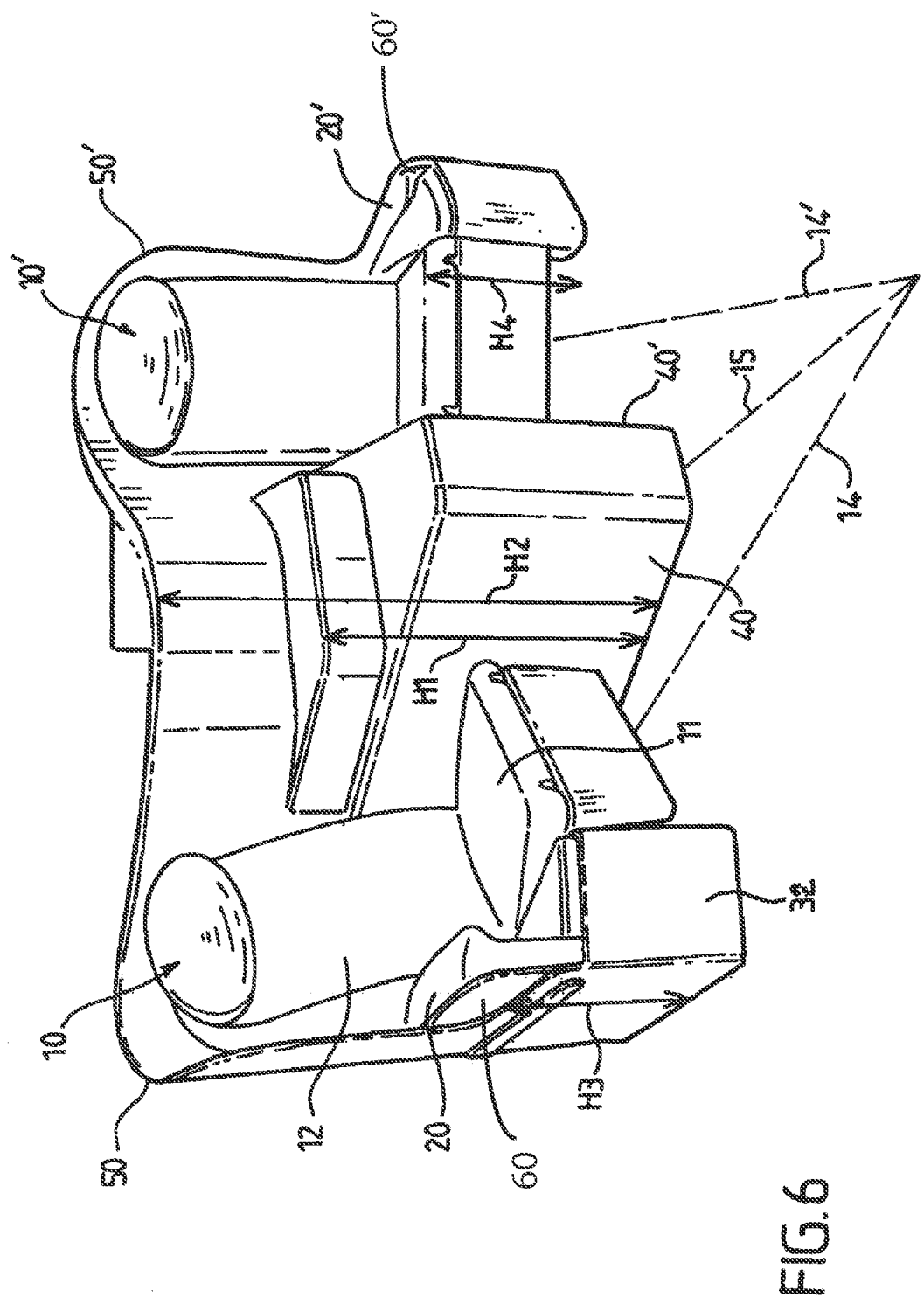
FIG. 6, a perspective view of a seat assembly according to one embodiment of the present invention.

The two adjoining seats in the central row form a seat assembly shown in FIG. 6. The seat 10 includes a back 12, a seating part 11 and an armrest 20 on a closed angle side. The armrest 20 is shifted with respect so the seating part 11, so as to leave a free space 30 between the seating part 11 and the armrest 20. This V shaped open area 30 makes it possible for the passenger of the seat to be along the axis of the plane in case of a shock without hitting the armrest. In addition, under this open area, a storage pocket 30 is provided which makes it possible for the passenger to store his or her personal belongings.

The two seats in FIG. 6 can be reclined in a sleeping position. They are arranged so that their respective axes 14 and 14 are shifted with respect to the axis 15 on the airplane and they form a V shape. In addition, a shelf 40 or 40 is adjoining each seat 10 and 10'. These two shelves are provided in the V shaped space between the herringbone seats. Both shelves 40 or 40 have a height H1 which is sufficient for isolating passengers on the two seats from each other when the seats are in a sleeping reclined position, but it makes it possible for the passengers on the two seats to see each other when be seats are in a seating position.

Each seat 10 or 10', as well as the armrest thereof on the closed angle side 20 or 20', is surrounded by a shell 50 or 50'. The shell has a height H2 at the back 12 level which is sufficient for isolating the head of the passenger in a seat when the latter is in the seating position and it has a height H3 which is lower than H2 and equal to the height H4 of the seating part, at the armrests 20 and 20' level.

Figure 7:
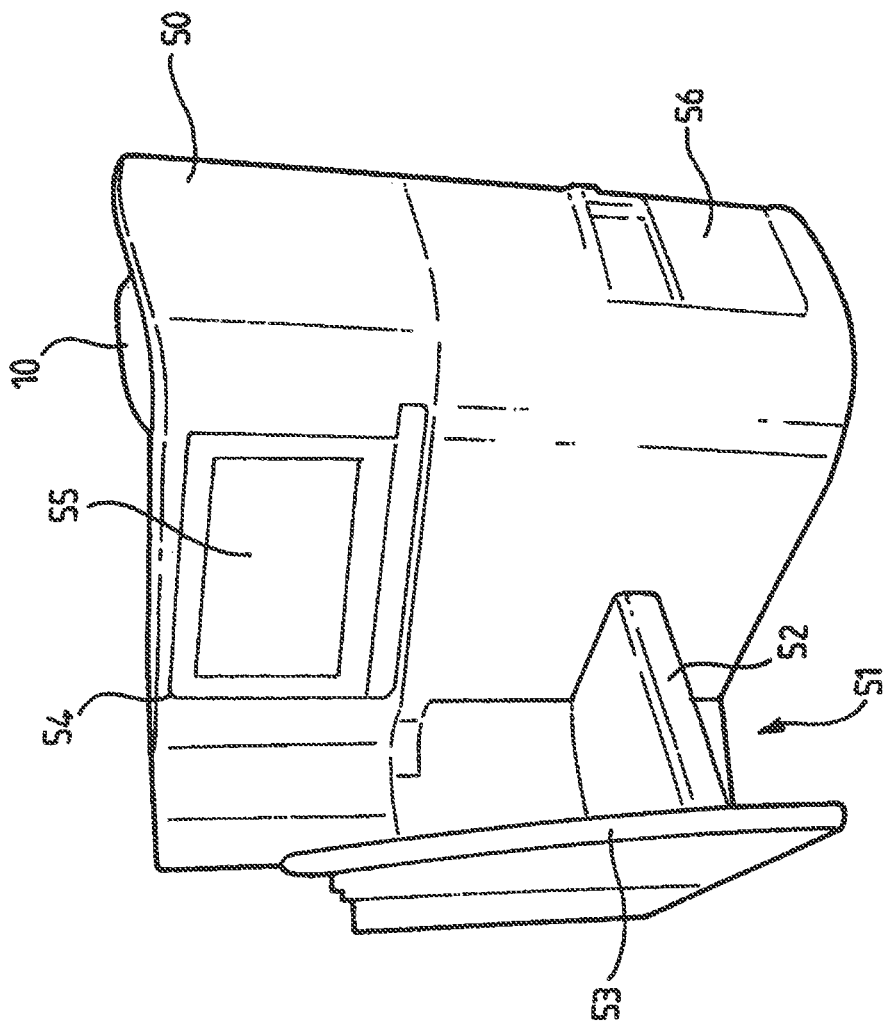
FIG. 7, a perspective view of the back of the seat according to the present invention.

FIG. 7 shows the back face of a seat according to the present invention, with the shell having a reinforcement 51 behind the central shelf, so as to leave more space behind the seat assembly: more particularly in this reinforcement is a vertical wall 53 and a footrest 52 making it possible for the passenger on the rear seat to extend his or tier legs and to rest his or her feet on the footrest 52 while gaining space. On the rear face of the shell is also a reinforcement 54 in which a video screen 55 provided as well as various storage pockets 56, making it possible for the passengers in the seats facing the back face of the shell to store the personal belongings.

The invention is not limited to the examples described and represented. For example, it is possible to produce the two seat assembly in one piece and to make a shell in one piece to surround both seats as well as the armrests thereof. It is also possible to produce an assembly of at least three seats for a passenger vehicle with end seats including at least one armrest on the closed angle side angularly shifted with respect to the seat, as previously described and wherein the seats and the armrests of the end seats are surrounded by a shell.

In addition, other mechanisms can be used for making t e armrest retractable, more particularly the armrest can be fixed to the back of the seat by a pivot connection and in this case it pivots between a horizontal position in which the passenger in the seat can rest his or her arm and a vertical position in which the access to the seat is cleared, so as to facilitate the seating of a disabled person.

The invention claimed is:

1. A seating assembly for an aircraft comprising a cabin having a floor and a longitudinal cabin axis extending in the main direction of aircraft travel, the seating assembly comprising:
   a. a first seat (i) comprising a seat back and a seat bottom, (ii) defining a longitudinal seat axis configured to form a non-zero, first angle to a longitudinal cabin axis, and (iii) configured to be positioned in at least a first position adapted to receive a sitting first passenger;
   b. a second seat (i) comprising a seat back and a seat bottom, (ii) defining a longitudinal seat axis configured to form a second angle to a longitudinal cabin axis, the second angle having approximately equal magnitude, but of opposite sign, as the first angle, and (iii) configured to be positioned in at least a first position adapted to receive a sitting second passenger;
   c. a shell extending behind the seat back of the first seat;
   d. a storage pocket; and
   e. at least first, second, and third surfaces, each generally horizontal and configured for use by the first passenger, the first surface comprising a non-rectangular armrest positioned generally to a first side of the seat bottom and configured to be of variable height above a cabin floor, the second surface comprising a shelf positioned generally to a second side of the seat bottom opposite the first side, the third surface being a plate of the storage pocket, and (i) the second and third surfaces configured to be of fixed height above a cabin floor, (ii) at least one of the first, second, and third surfaces configured to be at a different height above a cabin floor than the others of the first, second, and third surfaces, and (iii) the first surface rests on the third surface when the first surface is at its lowest height relative to a cabin floor.

2. A seating assembly according to claim 1 in which the armrest has an axis parallel to a longitudinal cabin axis.

3. A seating assembly according to claim 1 in which at least a portion of the shell is adjacent the armrest and parallel to a longitudinal cabin axis.

4. A seating assembly according to claim 3 in which the armrest has an axis parallel to a longitudinal cabin axis.

\* \* \* \* \*